(12) United States Patent
Petracca

(10) Patent No.: US 10,884,875 B2
(45) Date of Patent: Jan. 5, 2021

(54) INCREMENTAL BACKUP OF COMPUTER DATA FILES

(71) Applicant: Palantir Technologies Inc., Palo Alto, CA (US)

(72) Inventor: Thomas Petracca, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 175 days.

(21) Appl. No.: 15/839,746

(22) Filed: Dec. 12, 2017

(65) Prior Publication Data
US 2018/0173596 A1    Jun. 21, 2018

Related U.S. Application Data

(60) Provisional application No. 62/434,940, filed on Dec. 15, 2016.

(51) Int. Cl.
*G06F 7/00*     (2006.01)
*G06F 17/00*    (2019.01)
*G06F 11/14*    (2006.01)

(52) U.S. Cl.
CPC ...... *G06F 11/1469* (2013.01); *G06F 11/1451* (2013.01); *G06F 11/1471* (2013.01)

(58) Field of Classification Search
None
See application file for complete search history.

(56) References Cited

U.S. PATENT DOCUMENTS

| | | | |
|---|---|---|---|
| 5,724,575 A | 3/1998 | Hoover et al. |
| 5,872,973 A | 2/1999 | Mitchell et al. |
| 5,897,636 A | 4/1999 | Kaeser |
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |

(Continued)

FOREIGN PATENT DOCUMENTS

| | | |
|---|---|---|
| AU | 2014206155 | 12/2015 |
| EP | 0652513 | 5/1995 |

(Continued)

OTHER PUBLICATIONS

Anonymous, "BackTult—JD Edwards One World Version Control System", in 1 page, Jul. 23, 2007.

(Continued)

*Primary Examiner* — Tuan A Pham
(74) *Attorney, Agent, or Firm* — Sheppard Mullin Richter & Hampton LLP

(57) ABSTRACT

Systems and methods are provided for database or data file backup. The system may comprise one or more processors and a memory storing instructions that, when executed by the one or more processors, cause the system to identify a list of data files required for restoring the database or data files, create a backup comprising copies of a subset of the data files that are created or modified after a preceding backup, and back up the database, wherein the backup includes an identification to the preceding backup.

9 Claims, 4 Drawing Sheets

(56) References Cited

U.S. PATENT DOCUMENTS

| | | |
|---|---|---|
| 6,510,504 B2 | 1/2003 | Satyanarayana |
| 6,549,752 B2 | 4/2003 | Tsukamoto |
| 6,560,620 B1 | 5/2003 | Ching |
| 6,574,635 B2 | 6/2003 | Stauber et al. |
| 6,745,382 B1 | 6/2004 | Zothner |
| 6,976,210 B1 | 12/2005 | Silva et al. |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,266,655 B1 | 9/2007 | Escabi, II |
| 7,461,158 B2 | 12/2008 | Rider et al. |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,873,601 B1 * | 1/2011 | Kushwah ............ G06F 11/1451 |
| | | 707/654 |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,112,425 B2 | 2/2012 | Baum et al. |
| 8,126,848 B2 | 2/2012 | Wagner |
| 8,185,819 B2 | 5/2012 | Sah et al. |
| 8,200,637 B1 * | 6/2012 | Stringham .......... G06F 11/1451 |
| | | 707/670 |
| 8,229,902 B2 | 7/2012 | Vishniac et al. |
| 8,504,542 B2 | 8/2013 | Chang et al. |
| 8,676,857 B1 | 3/2014 | Adams et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,026,496 B1 | 5/2015 | Bachu et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,152,504 B1 * | 10/2015 | Bushman ............ G06F 11/1451 |
| 9,208,159 B2 | 12/2015 | Stowe et al. |
| 9,230,280 B1 | 1/2016 | Maag et al. |
| 9,280,532 B2 | 3/2016 | Cicerone |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2007/0050429 A1 | 3/2007 | Goldring et al. |
| 2007/0061487 A1 | 3/2007 | Moore et al. |
| 2007/0143253 A1 | 6/2007 | Kostamaa et al. |
| 2007/0185850 A1 | 8/2007 | Walters et al. |
| 2007/0233756 A1 * | 10/2007 | D'Souza ............ G06F 11/2041 |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2009/0031247 A1 | 1/2009 | Walter et al. |
| 2009/0037417 A1 | 2/2009 | Shankar et al. |
| 2009/0106308 A1 | 4/2009 | Killian et al. |
| 2009/0164387 A1 | 6/2009 | Armstrong et al. |
| 2009/0172669 A1 | 7/2009 | Bobak et al. |
| 2009/0177962 A1 | 7/2009 | Gusmorino et al. |
| 2009/0183254 A1 * | 7/2009 | Franco ................ H04L 63/0853 |
| | | 726/17 |
| 2009/0240664 A1 | 9/2009 | Dinker et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0318838 A1 | 12/2010 | Katano et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0153592 A1 | 6/2011 | DeMarcken |
| 2011/0161132 A1 | 6/2011 | Goel et al. |
| 2011/0173619 A1 | 7/2011 | Fish |
| 2011/0184813 A1 | 7/2011 | Barne et al. |
| 2011/0218968 A1 * | 9/2011 | Liu ....................... G06F 3/0482 |
| | | 707/649 |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0072825 A1 | 3/2012 | Sherkin et al. |
| 2012/0123989 A1 | 5/2012 | Yu et al. |
| 2012/0124179 A1 | 5/2012 | Cappio et al. |
| 2012/0136804 A1 | 5/2012 | Lucia |
| 2012/0150791 A1 | 6/2012 | Willson |
| 2012/0159307 A1 | 6/2012 | Chung et al. |
| 2012/0179655 A1 * | 7/2012 | Beatty ................... G06F 16/128 |
| | | 707/646 |
| 2012/0203742 A1 * | 8/2012 | Goodman ........... G06F 11/1451 |
| | | 707/646 |
| 2012/0330908 A1 | 12/2012 | Stowe et al. |
| 2013/0036346 A1 | 2/2013 | Cicerone |
| 2013/0060742 A1 | 3/2013 | Chang et al. |
| 2013/0080397 A1 | 3/2013 | Payne et al. |
| 2013/0097130 A1 | 4/2013 | Bingol et al. |
| 2013/0151388 A1 | 6/2013 | Falkenborg et al. |
| 2013/0159646 A1 * | 6/2013 | Atzmon ............... G06F 11/1466 |
| | | 711/162 |
| 2013/0304770 A1 | 11/2013 | Boero et al. |
| 2013/0318060 A1 | 11/2013 | Chang et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |

(56) References Cited

U.S. PATENT DOCUMENTS

| | | |
|---|---|---|
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0341467 A1 | 11/2015 | Lim et al. |
| 2016/0034545 A1 | 2/2016 | Shankar et al. |
| 2016/0062555 A1 | 3/2016 | Ward et al. |
| 2016/0147730 A1 | 5/2016 | Cicerone |
| 2016/0210342 A1* | 7/2016 | Vallabhaneni .......... G06F 3/061 |

FOREIGN PATENT DOCUMENTS

| | | |
|---|---|---|
| EP | 2555126 | 2/2013 |
| EP | 2863326 | 4/2015 |
| EP | 2891992 | 7/2015 |
| EP | 2993595 | 3/2016 |
| WO | WO 2012/025915 | 3/2012 |
| WO | WO-2015/074033 | 5/2015 |

OTHER PUBLICATIONS

Antoshenkov, Gennady, "Dictionary-Based Order-Preserving String Compression", The VLDB Journal, pp. 26-39, 1997.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu/authdbpub.pdf, p. 19, 2000.

Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Niepert et al., "A Dynamic Ontology for a Dynamic Reference Work", Joint Conference on Digital Libraries, pp. 1-10, Vancouver, British Columbia, Jun. 17-22, 2007.

Nierman, "Evaluating Structural Similarity in XML Documents", 6 pages, 2002.

Peng et al., "Large-scale Incremental Processing Using Distributed Transactions and Notifications", Proceedings of the 9th USENIX Symposium on Operating Systems Design and Implementation, USENIX, p. 14, 2010.

Quest, "Toad for ORACLE 11.6—Guide to Using Toad", pp. 1-162, Sep. 24, 2012.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System", Conference on Object-Oriented Technologies and Systems, pp. 219-231, Jun. 17-21, 1996.

Yang et al., "HTML Page Analysis Based on Visual Cues", A129, pp. 859-864, 2001.

Extended European Search Report for EP Appln. No. 20156726.0 dated Jun. 15, 2020, 8 pages.

* cited by examiner

INCREMENTAL BACKUP OF COMPUTER DATA FILES

CROSS REFERENCE TO RELATED APPLICATIONS

This application claims the benefit under 35 U.S.C. § 119(e) of U.S. Provisional Application Ser. No. 62/434,940 filed Dec. 15, 2016, the content of which is incorporated by reference in its entirety into the present disclosure.

FIELD OF THE INVENTION

This disclosure relates to approaches for backing up data files and restoring the date files when needed.

BACKGROUND

In general, a backup is a copy of data from a database or other data system that can be used to reconstruct that data. Backups can be physical backups and logical backups. A physical backup includes copies of files storing data to some other location, whether on disks or some offline storage such as tapes. With the increase of sizes of databases, making an entire copy of a database can be costly and slow.

SUMMARY

Various embodiments of the present disclosure can include systems, methods, and non-transitory computer readable media configured to create an incremental backup of a database following a preceding backup. In some embodiments, a list of data files required for restoring the database is identified. Further, a backup comprising copies of a subset of the data files that are created or modified after the preceding backup is created. In the backup, an identification to the preceding backup can be included.

In some embodiments, the database constitutes a keyspace of a larger database. In some embodiments, the data files are immutable. In some embodiments, the list does not include data files in the database that have been replaced by updated data files. In some embodiments, the subset of data files is identified by comparing the list of the backup to a likewise identified list during the preceding backup.

Also provided, in some embodiments, are systems, methods, and non-transitory computer readable media configured to restore a database. First, the system receives at least the latest backup of a sequential series of incremental backups generated for the database, wherein each backup comprises (a) an identification to the respective preceding backup, (b) a list of data files, when the respective backup was identified, required for restoring the database, and (c) copies of data files that were created or modified after the preceding backup. All data files in the latest backup are restored to the database and the system can locate copies of the remaining data files in the list of the latest backup by traversing through each preceding backup and restoring the located copies to the database.

In some embodiments, the data files are immutable. In some embodiments, the latest backup is the most recent before a desired restoration time point.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
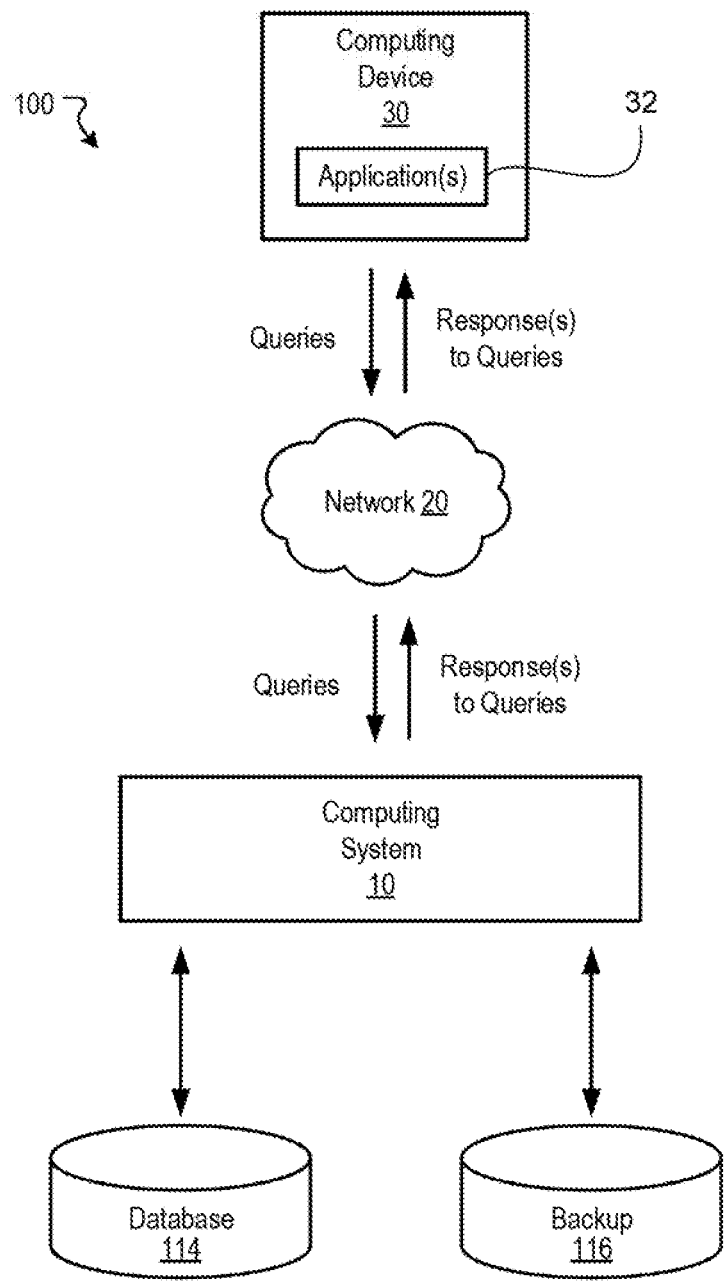
FIG. 1 illustrates a block diagram of an example of a system for performing database backups, according to embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Making a backup of a large database can be expensive. The process can include downloading of hundreds of terabytes of data and physically moving disks containing such data to a storage location. For instance, in an open source Cassandra database system, the system backs up data by taking a snapshot of all data files of a keyspace, which are referred to as SSTable files, and storing the snapshot. Cassandra has an incremental backup option which, when enabled, creates backup data files at the time when new data files are generated. Such an option, however, creates overhead during database operation and results in generation of many small data files.

A claimed solution rooted in computer technology overcomes problems specifically arising in the realm of computer technology. In accordance with one embodiment of the disclosure, when a backup is scheduled or desired, the computer system identifies a list of all data files of the database or a relevant portion of the database (e.g., a keyspace). Such list, in a preferred embodiment, only includes data files that represent the current status of the database and does not include obsolete data files. For instance, in certain database systems such as Cassandra, each data file is immutable and thus is not updated but can be replaced by a newer data file. When old data files are replaced by new data files, the list only includes the new data files. The term "immutable" refers to a computational object, such as a database file, whose state cannot be modified after it is created. This is in contrast to a mutable object (changeable object), which can be modified after it is created. In some embodiments, an object is considered immutable even if some internally used attributes change but the object's state appears to be unchanging from an external point of view.

The list can then be compared to a likewise identified list when the preceding backup was made, which can be referred to as a "parent" backup. It will become apparent, based on the comparison, what data files are new, i.e., those created after the parent backup was made. If no parent backup has been made, the list then includes all of the data files. Accordingly, in some embodiments, when a backup is made, a "backup_id" is generated representing the current backup. A "parent_id" is also included in the backup referring to the parent backup. When no parent backup has been made, the parent_id can be set as equal to backup_id or another predetermined value, such as NULL or zero.

Once the new data files are identified from the comparison as described above, copies of the new data files can be made, packaged, and/or moved to off-site storage. As only copies of the new data files are included in the backup, the size of the backup is greatly reduced as compared to when the entire database is subject to the backup.

Restoration of the database from the backup files, in one embodiment, starts with restoration of the latest backup. The list of data files in the latest backup shows all data files needed to restore the database. Any data file which has a copy in the latest backup can be downloaded/copied back to the database. Copies of data files not in the latest backup can be found by traversing through parent_id's until they are located in one of the parent backups. It is readily appreciated that obsolete data files do not need to be restored to the database.

FIG. 1 illustrates a block diagram of an example of a system 100 for performing data backup and restoration, according to embodiments of the present disclosure. The example system shown in FIG. 1 includes a computing system 10 and a computing device 30 that can communicate with one another over a network 20. The computing system 10 may be configured to implement one or more of the various embodiments described herein. Depending on the implementation, the computing device 30 may be any computing device having one or more processors, e.g., a mobile device. The network 20 may include one or more computer networks (e.g., the Internet, local area networks, etc.) or other transmission mediums. Such networks may be wired and/or wireless. The system 100 may include more, fewer, or alternative components than those shown in FIG. 1.

In various embodiments, the computing device 10 can be configured to process queries that are received from various computing devices, e.g., the computing device 30. Such queries may involve requesting data that is stored in one or more tables of a database, writing new data in the one or more tables of the database, modifying existing data in the one or more tables of the database, and/or deleting existing data in the one or more tables of the database. The computing device 10 can process such queries and provide data that is responsive to the queries. In some instances, the computing device 30 may be running one or more software applications 32 that have been configured to query data that is stored in a particular database, e.g., the database 114.

In various embodiments, a backup of data from a database, e.g., the database 114, or a relevant portion of the database, to a backup medium, e.g., 116, may involve copying data or data files from the database 114.

The term "database" may refer to any data structure for storing and/or organizing data, including, but not limited to, relational databases (Oracle database, mySQL database, Cassandra database, etc.), spreadsheets, XML, files, and text file, among others. In some embodiments, a database schema of a database system is its structure described in a formal language supported by the database management system. The database may store and organize data in data files, which can be backed up individually.

Figure 2:
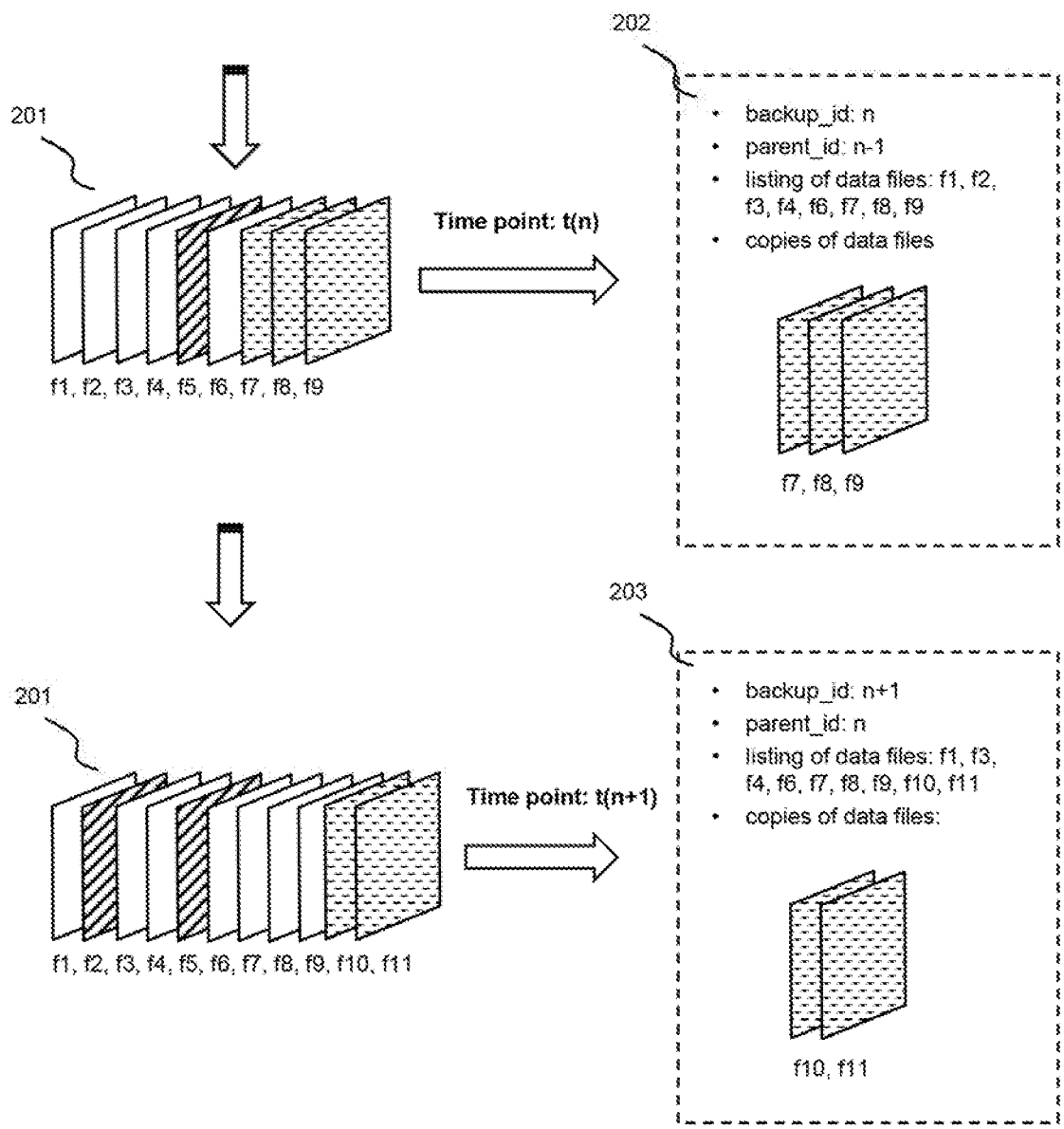
FIG. 2 illustrates a database backup procedure.

With reference to FIG. 2, a database or a schema/keyspace of the database 201 has its data stored in data files f1 through f9 at a time point (shown as t(n) in the figure). At this time, compared to when a last backup was done, data files f7, f8 and f9 are new. Date file f5, even though still in existence but can be optionally deleted, has been replaced by a new data file. A backup to be created at this moment, 202, can include certain metadata and copies of some of the data files.

Figure 3:
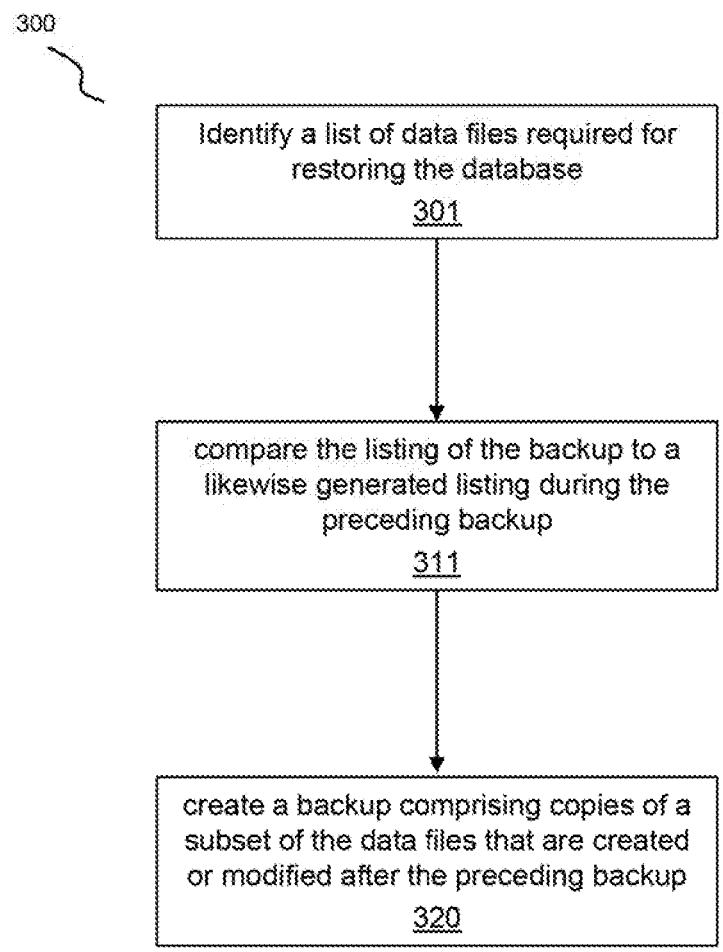
FIG. 3 illustrates a flowchart of an example method for performing incremental database backups, according to embodiments of the present disclosure.

As illustrated in FIG. 3, the metadata of backup 202 can include a backup identification reference (e.g., backup_id) and a parent backup identification reference (e.g., parent_id) that refers to the preceding backup. If a particular backup does not have a parent, then the parent_id can be set as NULL, 0, or be equal to the current backup_id. The backup can also include a list of all data files that are required to restore the database 201. In this example, such data files are f1, f2, f3, f4, f6, f7, f8 and f9 (without f5).

The list can be identified at the time a backup is desired or scheduled, such as by checking the status of each individual data file to see whether the data file is up to date. Alternatively, the list can be identified, or copied from, a log of data files that is updated, in real time, when a new data file is created or updated.

As explained above, not all data files in 201 need to be backed up. As illustrated in backup 202 of FIG. 3, since only data files f7, f8 and f9 are new, only copies of these files are needed in the backup.

Likewise, at time point t(n+1), new data files f10 and f11 have been created, and data f2 is superseded (or deleted). Therefore, the backup 203 includes a list that includes f1, f3, f4, f6, f7, f8, f9, f10, and f11. Data files (e.g., f10 and f11 here) that need to be backed up can be identified by comparing the list of backup 203 to that of backup 202, for instance.

Restoration of the database 201 can be carried out when needed. Suppose it is desired that the database 201 be restored to the status at time point t(n+1), all data files in backup 203 (i.e., with backup_id=n+1), including f10 and f11, are restored to the database. The additional data files that are needed to restore the database can be found in the list of data files in backup 203. Those are f1, f3, f4, f6, f7, f8 and f9. To locate these files, the system can search through each preceding backup one by one (from latest to earliest) until each data file is found. Data files, that have been deleted or superseded by new data files, e.g., f2 and f5, do not need to be restored.

In the example of FIG. 2, the data files are assumed to be immutable. That is, once created, a data file is no longer changed. Updates to an immutable data file can be done by replacing the data file with an updated data file. It is to be understood, however, that the present technology can also work on data files that are not immutable. For instance, if an old data file f5 is updated at time point t(n+1), then the list of backup 203 will include data file f5 as the updated f5 has not been backed up at time point t(n). When restoring the database, once the data file f5 from backup 203 is restored, no more restoration of data file f5 is needed even if a copy of an obsolete version of f5 can be found in an earlier backup. In other words, when traversing the backups, only the first data file encountered is use for the restoration and any additional (i.e., older) copies are not needed.

FIG. 3 illustrates a flowchart of an example method 300 for database backup, according to various embodiments of the present disclosure. The method 300 may be implemented in various environments including, for example, the environment 100 of FIG. 1. The operations of method 300 presented below are intended to be illustrative. Depending on the implementation, the example method 300 may include additional, fewer, or alternative steps performed in various orders or in parallel. The example method 300 may be implemented in various computing systems or devices including one or more processors.

At block 301, a list of data files required for restoring the database is identified. Assuming this is not the first backup of the database and in a preceding backup a similar list has been identified, at block 311, these two lists can be compared to determine what data files are new since the last backup. Then, at block 320, copies of the new data files can be created, which will be part of the backup. It is appreciated that block 311 is not necessary to determine the new data files. For instance, a log file that keeps track of newly created or updated data files since the last backup can be used to identify data files for purpose of block 320.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
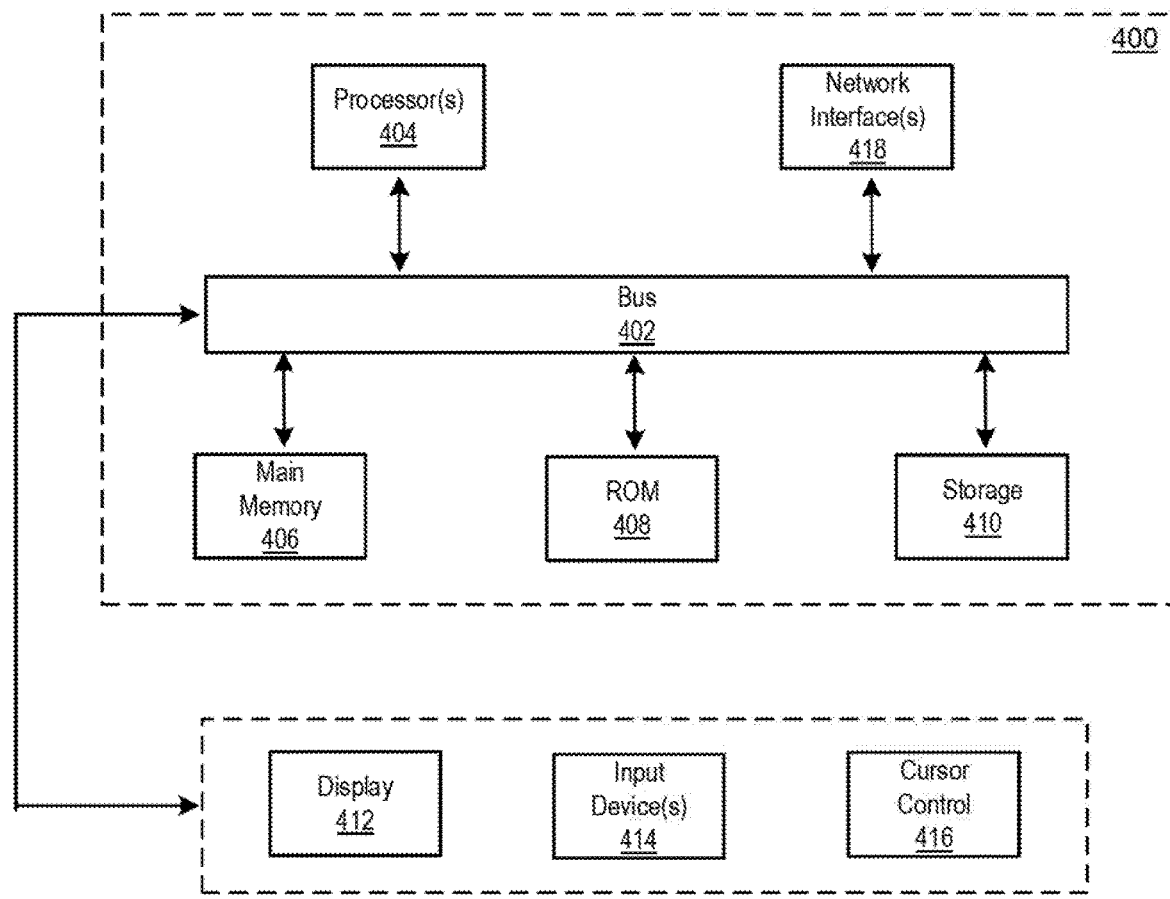
FIG. 4 is a block diagram that illustrates a computer system upon which any of the embodiments described herein may be implemented.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware.

Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieve and execute the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method for creating an incremental backup of a database following a preceding backup, being implemented by a computing system including one or more physical processors and storage media storing machine-readable instructions, the method comprising:
   accessing a schema of the database;
   identifying, in the schema, a list of data files required for restoring the database, the data files being immutable and the list excluding data files that have been replaced by updated data files;
   determining whether a preceding backup exists;
   in response to determining that the preceding backup does not exist:
      creating a first backup comprising the list of the data files; and
      creating first metadata of the first backup comprising:
         a first backup identification reference; and
         an identification representing a state of the preceding backup set to be equal to the first backup identification reference; and
   in response to determining that the preceding backup exists:
      creating a second backup comprising copies of a subset of the data files that have been created or modified after the preceding backup; and
      creating second metadata of the second backup comprising:
         a second backup identification reference;
         a parent backup identification reference referring to the preceding backup; and
         the list of the data files, wherein the creating the second backup comprises:
            determining the subset of the data files as comprising files from the list not present in a list of data files required for restoring the database created during the preceding backup; and
            backing up the database, wherein the backup includes the subset of the data files.

2. The method of claim 1, wherein the database constitutes a keyspace of a larger database.

3. A system for creating an incremental backup of a database following a preceding backup, the system comprising:
   one or more processors; and
   a memory storing instructions that, when executed by the one or more processors, cause the system to perform:
      accessing a schema of the database;
      identifying, in the schema, a list of data files required for restoring the database, the data files being immutable and the list excluding data files that have been replaced by updated data files;
      determining whether a preceding backup exists; in response to determining that the preceding backup does not exist:
      creating a first backup comprising the list of the data files; and
      creating first metadata of the first backup comprising:
         a first backup identification reference; and
         an identification representing a state of the preceding backup set to be equal to the first backup identification reference; and
   in response to determining that the preceding backup exists:
      creating a second backup comprising copies of a subset of the data files that have been created or modified after the preceding backup; and
      creating second metadata of the second backup comprising:
         a second backup identification reference;
         a parent backup identification reference referring to the preceding backup; and
         the list of the data files, wherein the creating the second backup comprises:
            determining the subset of the data files as comprising files from the list not present in a list of data files required for restoring the database created during the preceding backup; and backing up the database, wherein the backup includes the subset of the data files.

4. The system of claim 3, wherein the database constitutes a keyspace of a larger database.

5. The system of claim 3, wherein a state of the data files is unchanging from an external point of view.

6. A non-transitory computer readable medium for creating an incremental backup of a database following a preceding backup, the medium comprising instructions that, when executed, cause one or more processors to perform:
   identifying, in a schema of the database, a list of data files required for restoring the database, the data files being immutable and the list excluding data files that have been replaced by updated data files;
   determining whether a preceding backup exists;
   in response to determining that the preceding backup does not exist:

creating a first backup comprising the list of the data files; and creating first metadata of the first backup comprising:
- a first backup identification reference; and
- an identification representing a state of the preceding backup set to be equal to the first backup identification reference; and in response to determining that the preceding backup exists:
- creating a second backup comprising copies of a subset of the data files that have been created or modified after the preceding backup; and
- creating second metadata of the second backup comprising:
  - a second backup identification reference;
  - a parent backup identification reference referring to the preceding backup; and
  - the list of the data files, wherein the creating the second backup comprises:
    - determining the subset of the data files as comprising files from the list not present in a list of data files required for restoring the database created during the preceding backup; and
    - backing up the database, wherein the backup includes the subset of the data files.

7. The non-transitory computer readable medium of claim 6, wherein the database constitutes a keyspace of a larger database.

8. The non-transitory computer readable medium of claim 6, wherein the data files are immutable.

9. The non-transitory computer readable medium of claim 8, wherein the list does not include data files in the database that have been replaced by updated data files.

* * * * *